9 Sheets—Sheet 5.
R. P. WILLIAMS.
RAILWAY CROSSING.
No. 105,754.  Patented July 26, 1870.
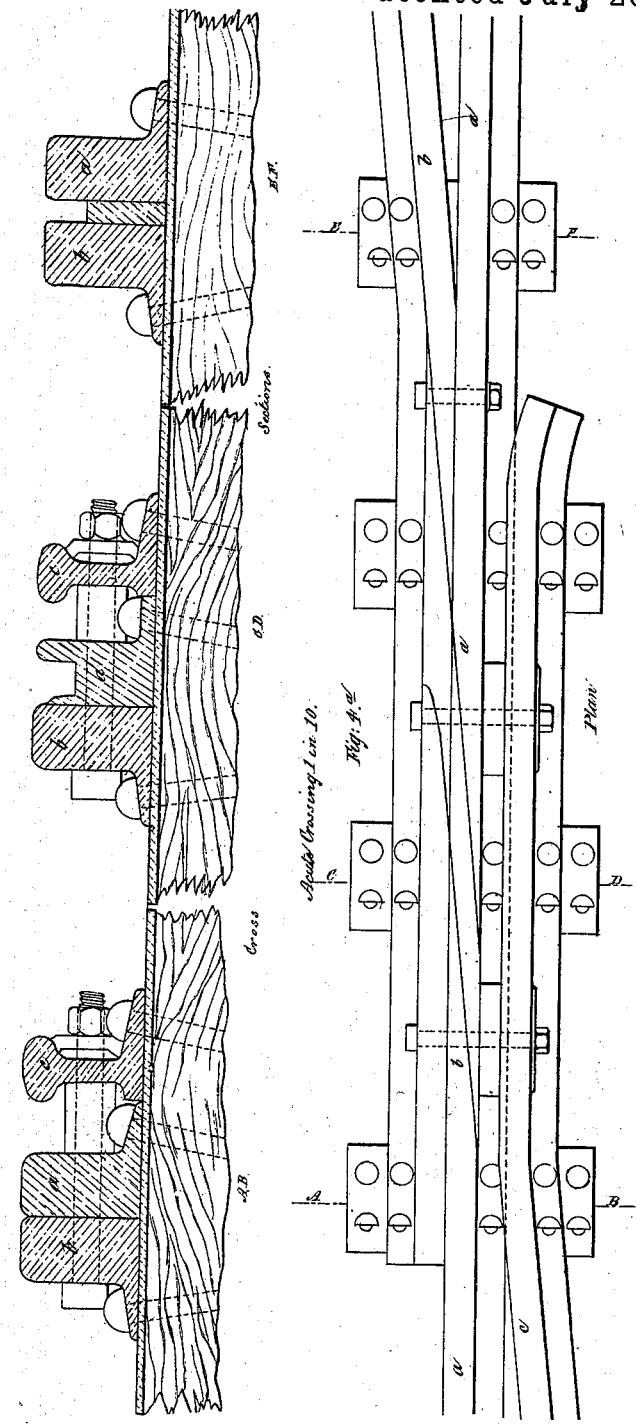

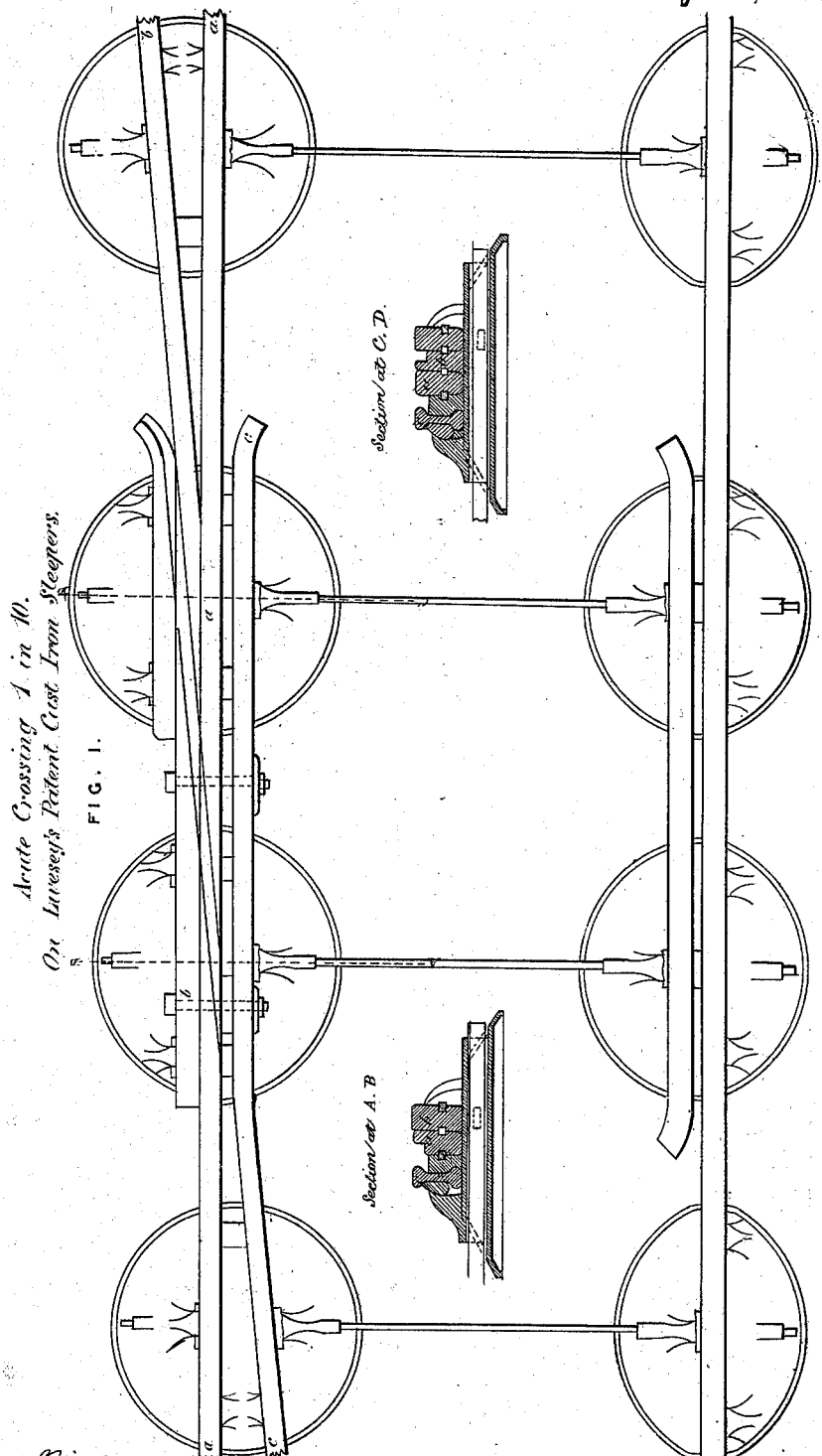

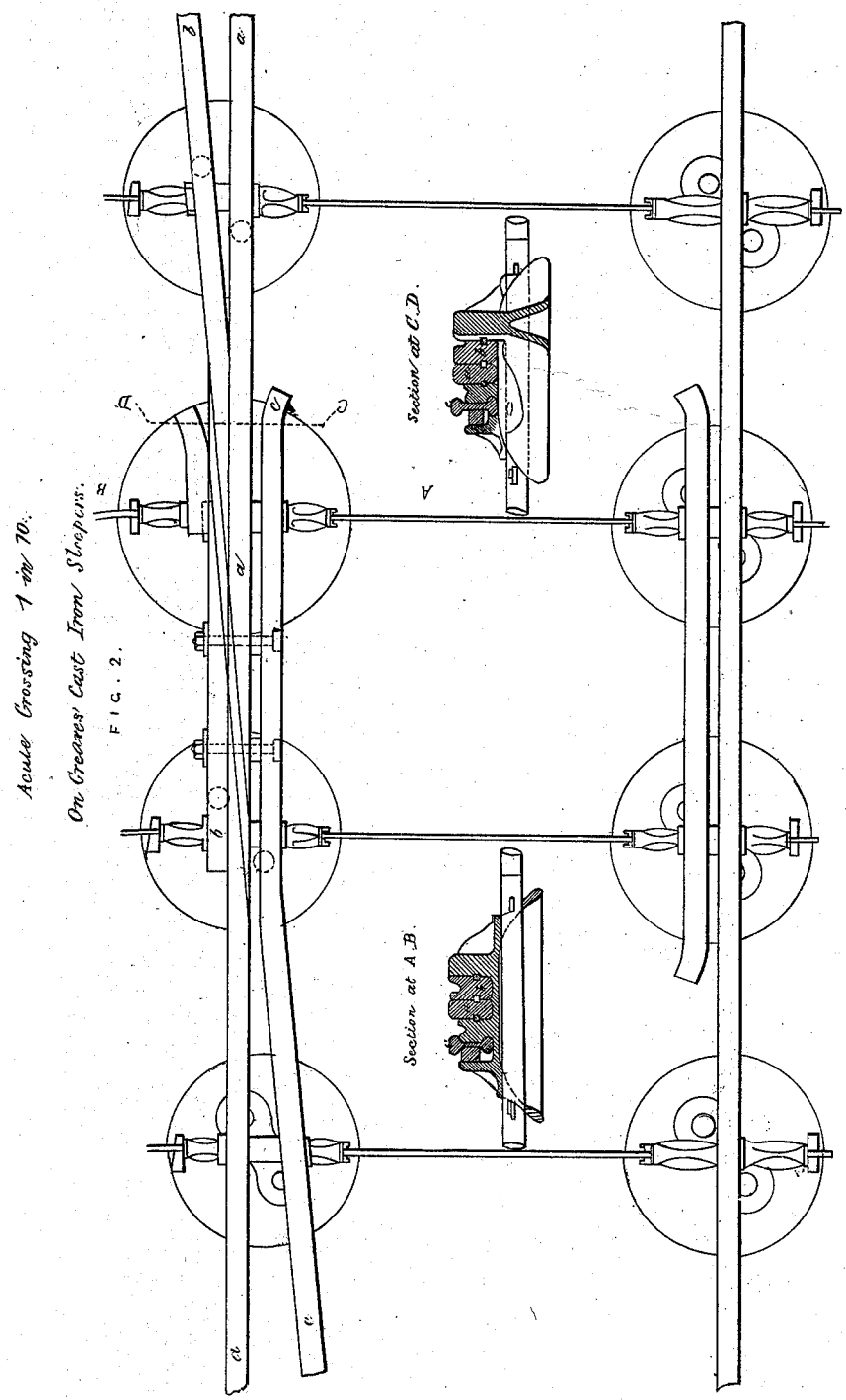

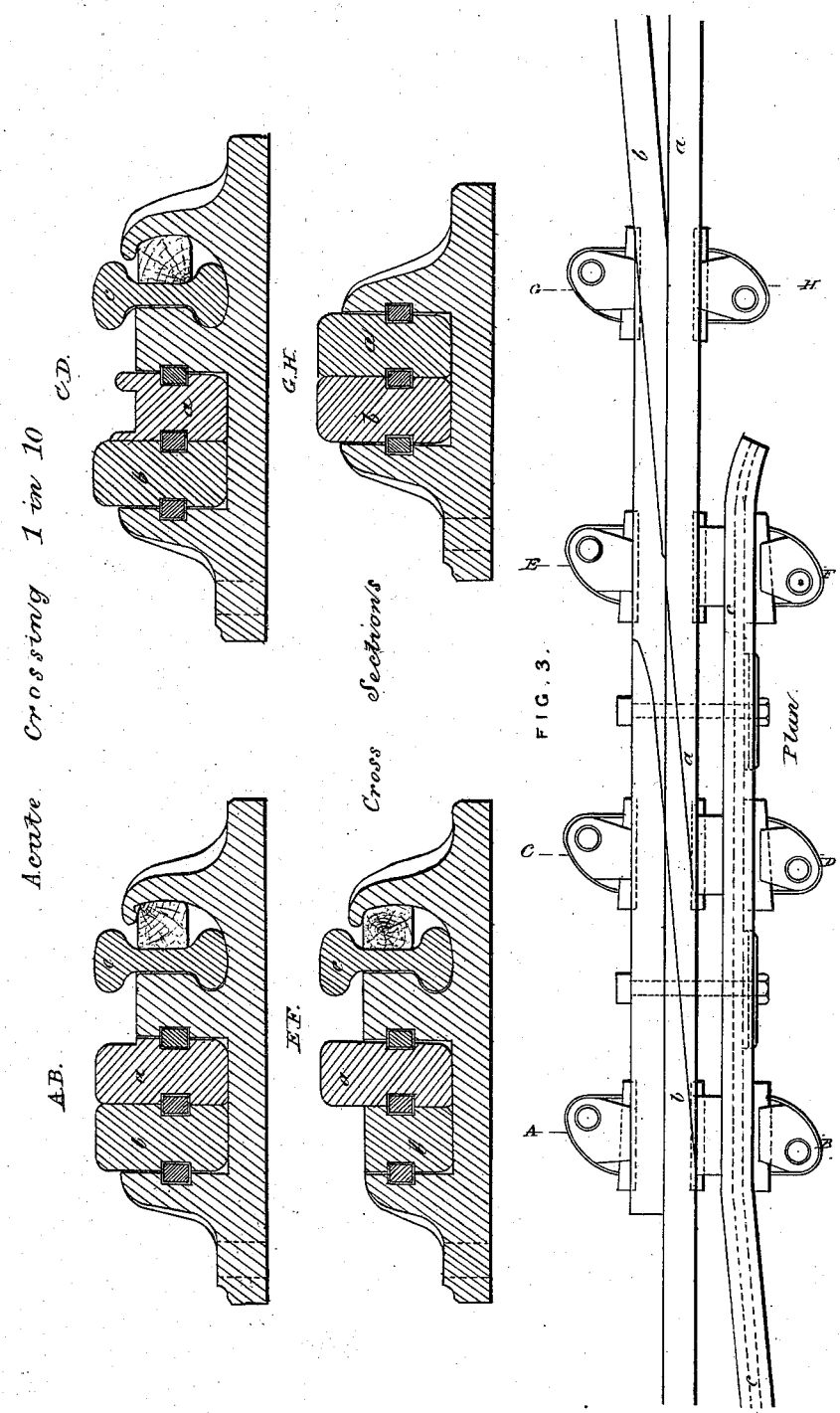

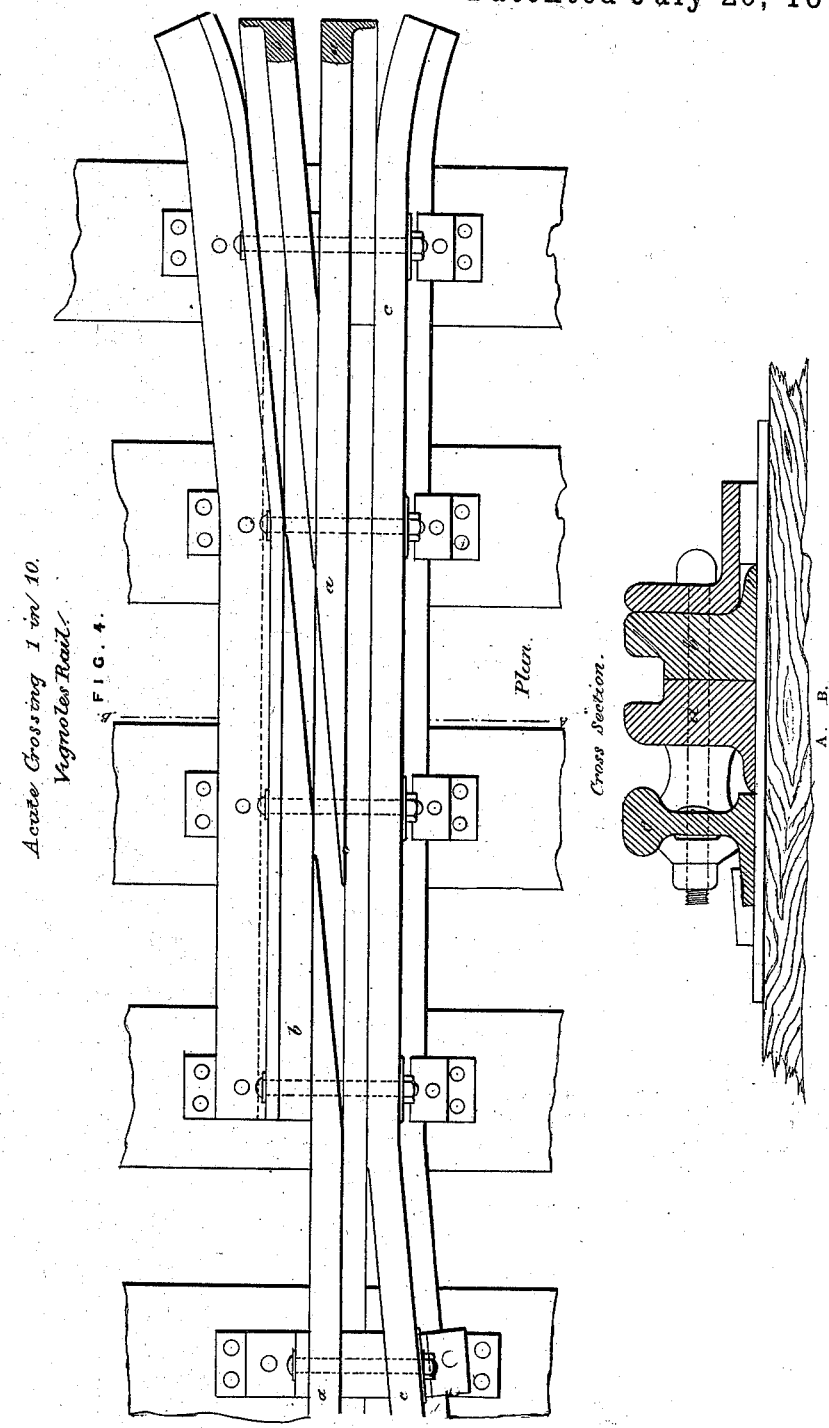

9 Sheets—Sheet 6.
R. P. WILLIAMS.
RAILWAY CROSSING.
No. 105,754.    Patented July 26, 1870.
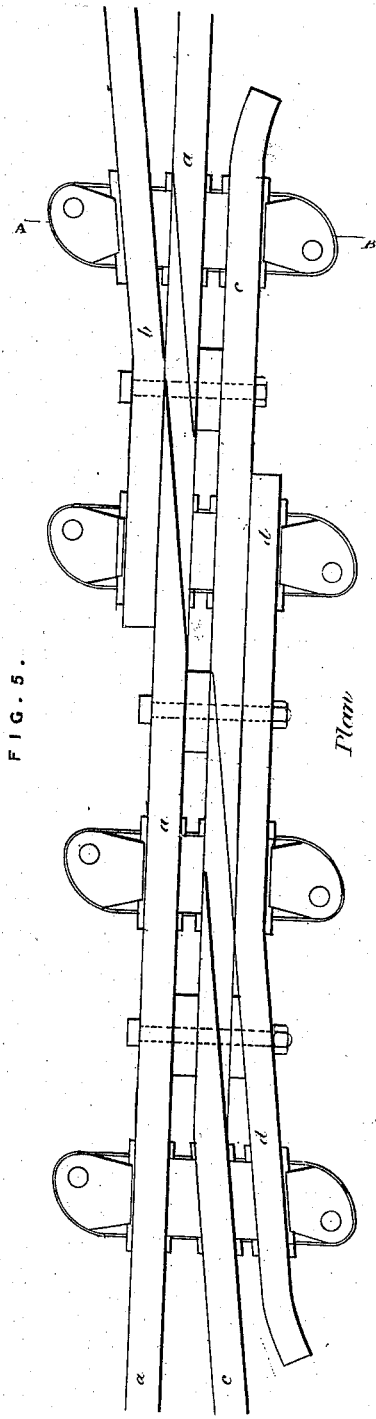
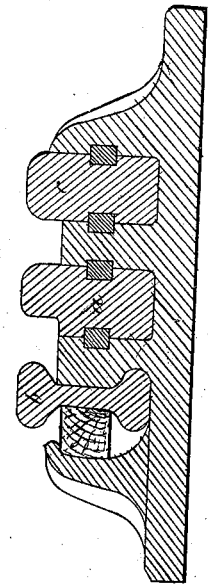

9 Sheets—Sheet 7.
R. P. WILLIAMS.
RAILWAY CROSSING.
No. 105,754.
Patented July 26, 1870.
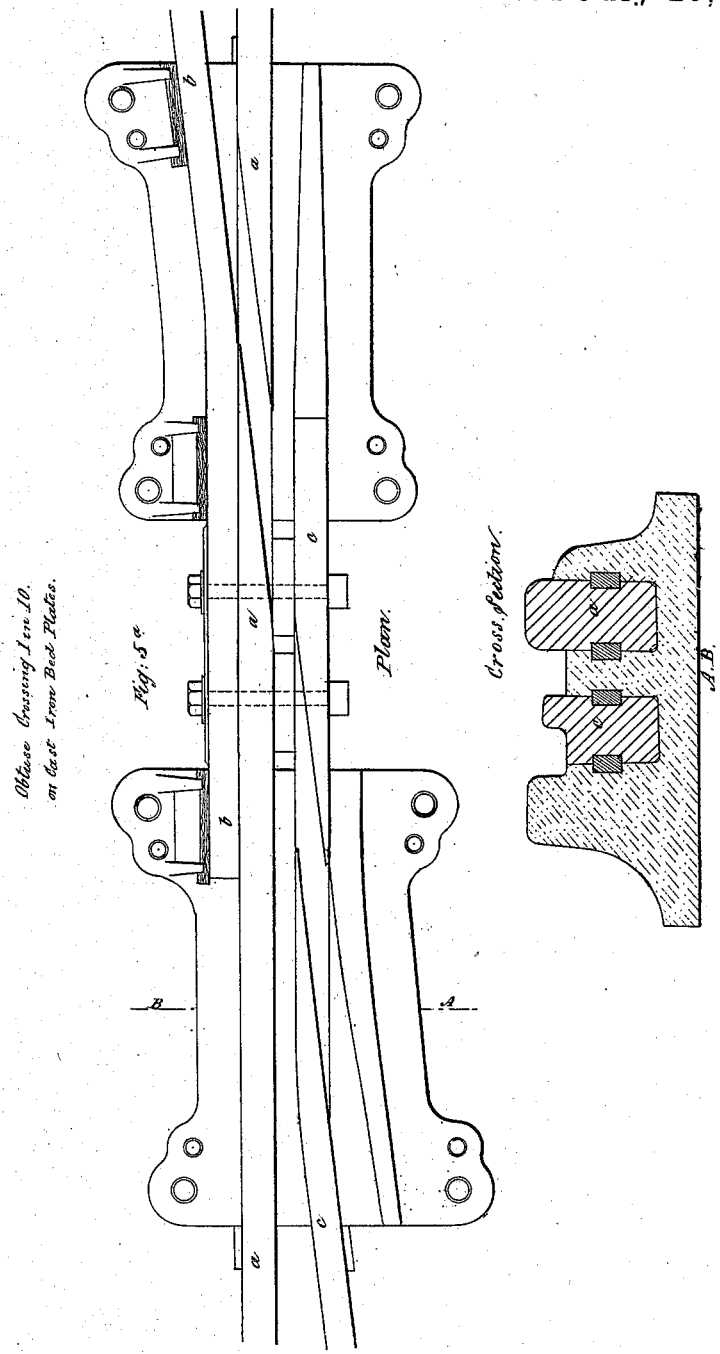

9 Sheets—Sheet 8.
R. P. WILLIAMS.
RAILWAY CROSSING.
No. 105,754. Patented July 26, 1870.
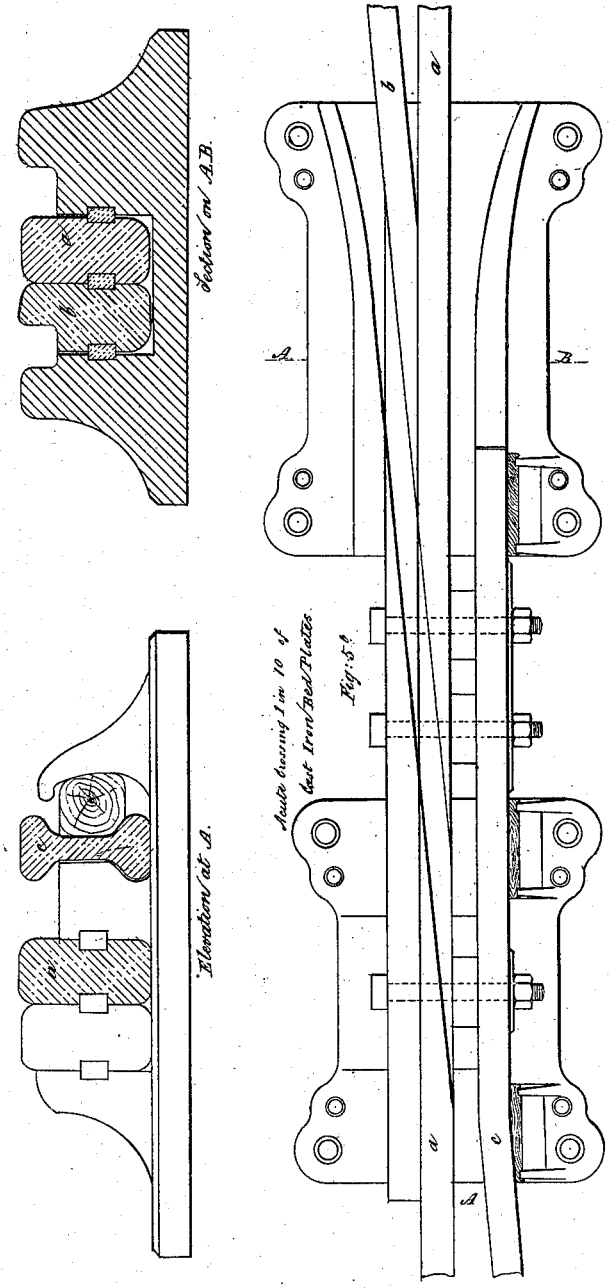

9 Sheets—Sheet 9.
R. P. WILLIAMS.
RAILWAY CROSSING.
No. 105,754.  Patented July 26, 1870.
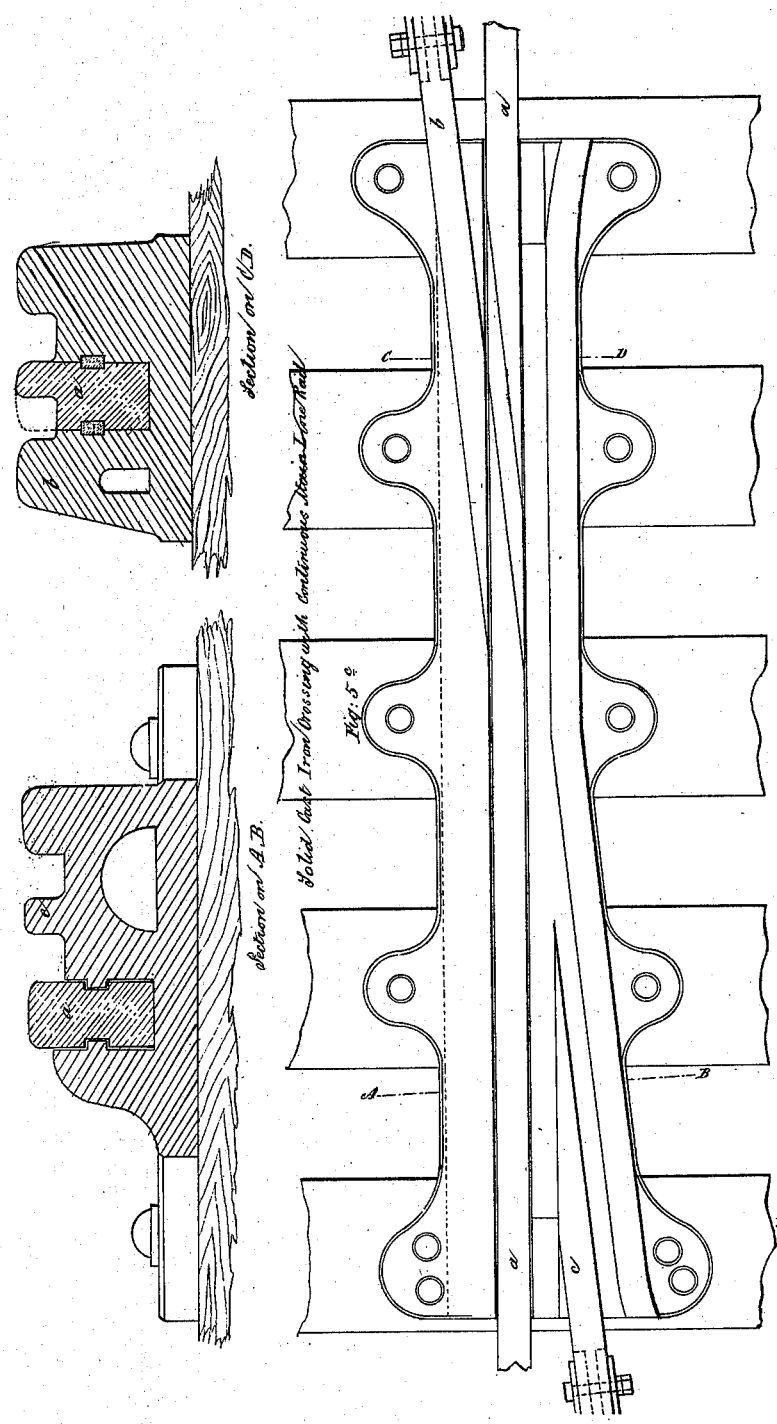

United States Patent Office.

RICHARD PRICE WILLIAMS, OF GREAT GEORGE STREET, WESTMINSTER, ENGLAND.

Letters Patent No. 105,754, dated July 26, 1870; patented in England February 22, 1869.

IMPROVEMENT IN RAILWAY CROSSINGS.

The Schedule referred to in these Letters Patent and making part of the same.

*To all to whom it may concern:*

Be it known that I, RICHARD PRICE WILLIAMS, of Great George Street, Westminster, England, civil engineer, a subject of the Queen of Great Britain, have invented or discovered new and useful Improvements in Railway Crossings; and I, the said RICHARD PRICE WILLIAMS, do hereby declare the nature of the said invention, and in what manner the same is to be performed, to be particularly described and ascertained in and by the following statement thereof, that is to say—

This invention has for its object improvements in railway crossings.

In constructing railway crossings where two lines cross each other, I form one of the crossing lines of a continuous rail, and the other crossing line in two parts, one on each side of the continuous rail, and where these meet the continuous rail they are bent round at an angle to come parallel with the continuous rail, and they are securely fixed to it.

The bent end of the part or rail that comes up to the inner side of the continuous rail is retained at the requisite distance from it to serve as a guard-rail, and allows a passage for the flange of the wheels between the two.

The continuous rail and the bent end of one of the parts of the crossing rail are notched out to the requisite depth for the passage of the tire of a wheel. In the case of an obtuse crossing, the end of the rail which forms the guard-rail is thus notched, but in the case of an acute crossing, then the bent end of the other rail is notched out.

In the drawing hereunto annexed I have shown various ways of supporting a crossing constructed in the manner above described.

In the plan view, Figure 1, an acute crossing is shown; the lines of rail are supported on what are known as Livesay's cast-iron sleepers;

In the plan view, Figure 2, the lines are shown to be supported on what are known as Greaves' cast-iron sleepers; and In the plan view, Figure 3, the lines are shown to be supported in cast-iron chairs, to be fixed to wooden sleepers in the ordinary manner.

In each of the above figures the rails $a$ and $b$ are shown to be solid rails, as I prefer that they should be.

The rails $c$ are ordinarily double-headed rails, similar to the rails with which the line is laid.

In the plan views, Figures 4 and $4^a$, are shown crossings where rails with a flat base or Uignolles section are employed.

In all the above figures the crossings shown are acute crossings; $a$ $a$ are the main-line rails, $b$ and $c$ the two parts of the crossing rail, the part $b$ coming up to the outer side of the rail, being bent round and securely held close up to the main-line rail, while the part $c$, that comes up to the inner side, is bent, and is secured at sufficient distance from the main-line rail to allow of its being used as a guard-rail, as is clearly shown by each of the figures.

The rail $b$, and the through rails, have flange-passages cut in them, as the drawing shows. The manner in which the rails of the crossing are secured in each of the arrangements is clearly shown in the figures, and the transverse sections represented in connection with them, so that it is unnecessary to give here any detailed description of these points.

At Figure 5 is shown an obtuse crossing; the rails are supported in cast-iron chairs affixed to wooden sleepers; the rail $c$ is, in this case, notched out, as above stated, in place of the rail $b$.

$d$ is a rail serving as a guard-rail.

At Figure $5^a$ the crossing lines are carried on two cast-iron bed-plates to be similarly fixed to sleepers.

An acute crossing similarly carried on two cast-iron bed-plates is shown at Figure $5^b$.

The arrangement may be modified by casting the rails $b$ and $c$ in one block, also forming a chair for the rail $a$; such a crossing is shown at Figure $5^c$.

Having thus described the nature of my said invention, and the manner of performing the same, I would have it understood that

What I claim is—

The construction of railway crossings with one of the crossing lines a continuous rail, and the other in two parts, which are bent round parallel to the continuous rail, and fixed to it, flange-passages also being left, and formed substantially as herein described.

R. PRICE WILLIAMS.

Witnesses:
WILMER M. HARRIS, } Both of No. 17 Gracechurch St., London.
THOS. BROWN.